US00H002250H

(19) United States
(12) Statutory Invention Registration
Gipson

(10) Reg. No.: US H2250 H
(43) Published: Nov. 2, 2010

(54) SELECTABLY ELEVATABLE COILED TUBING RIG CONTROL HOUSED WITHIN A WATER TANK

(75) Inventor: Tommie Carroll Gipson, Eaton, CO (US)

(73) Assignee: RRI Holdings, Inc., Dallas, TX (US)

(21) Appl. No.: 12/378,137

(22) Filed: Feb. 11, 2009

(51) Int. Cl.
*E21B 19/22* (2006.01)
*B60P 3/035* (2006.01)

(52) U.S. Cl. ..... 166/77.2; 280/656

(58) Field of Classification Search ..... 166/77.2; 280/656

See application file for complete search history.

(56) References Cited

U.S. PATENT DOCUMENTS 7,182,163 B1 * 2/2007 Gipson ..... 180/8.1
7,552,890 B1 * 6/2009 Gipson ..... 242/564.4
7,708,058 B1 * 5/2010 Gipson ..... 166/77.2
2006/0022477 A1 * 2/2006 Imhof ..... 296/26.07
2009/0236179 A1 * 9/2009 Lopez ..... 182/63.1

* cited by examiner

*Primary Examiner*—Dan Pihulic
(74) *Attorney, Agent, or Firm*—Elizabeth R. Hall

(57) ABSTRACT

A mobile coiled tubing rig for the drilling and workover of wells is designed to have a control room for the coiled tubing rig positioned within a tank at the forward end of the rig during transport. The control room, stored in the empty tank during transit, is selectably elevated out of the tank to its working position during rig operation When the control room is elevated, the operator or operators of the coiled tubing rig can see the coiled tubing storage wheel and the coiled tubing injector.

20 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELECTABLY ELEVATABLE COILED TUBING RIG CONTROL HOUSED WITHIN A WATER TANK

BACKGROUND OF THE INVENTION

1.Field of the Invention

The present invention relates to an elevatable control room for a mobile coil tubing rig for the drilling and workover of wells. In particular, the present invention concerns the placement of a control room for the coiled tubing rig within a tank at the forward end of the rig, wherein the control room is stored in an empty tank during transit but is selectably elevated out of the tank to its working position during rig operation.

2. Description of the Related Art

Currently, elevatable control rooms are used on some coiled tubing trailer mounted rigs. Typically, it is necessary to keep the control rooms in a lowered position for meeting limitations on load height during highway transit for coiled tubing rig. Once on location, the control rooms are elevated so that the operator in the control room will have an unobscured view of the tubing storage reel and the tubing injector. However, space on a self contained coiled tubing trailer is highly limited, due to the large size of the tubing reel and the undesirability of using overly long trailers. Trailer space limitations are particularly acute when a wheel type tubing tensioner is used.

Since water and other fluids are required at the well site, an auxiliary tank for water or other fluids is generally transported to the well location. For conventional trailer mounted coiled tubing rigs, such an auxiliary tank has to be transported to and from a well location by a separate truck.

A need exists for minimizing the overall footprint of a coiled tubing rig on its transport trailer.

A further need exists for minimizing vehicle requirements for hauling a self contained coiled tubing rig and its typical accessories to and from well locations.

SUMMARY OF THE INVENTION

This invention pertains to an elevatable control room for a mobile self-contained coil tubing rig for the drilling and workover of wells. During transport of the coiled tubing rig, the control room is positioned in a selectably fillable tank at the forward end of the rig during transport. The control room, stored in the empty tank during transit, is selectably elevated out of the tank to its working position during rig operation. When the control room is elevated, the operator or operators of the coiled tubing rig can see the coiled tubing storage wheel and the coiled tubing injector.

One embodiment of the present invention includes a trailer-mounted coiled tubing rig comprising: a coiled tubing storage reel mounted on a trailer; a coiled tubing injector; an auxiliary tank; and a control room selectably moved from a first stored position to a second elevated position, wherein a portion of the control room is positioned within the auxiliary tank in the first stored position and wherein a top of the control room is moved away from a bottom of the auxiliary tank until the top of the control room is positioned at a greater height from the trailer than the coiled tubing storage reel and the coiled tubing injector.

A second embodiment of the present invention includes a trailer-mounted coiled tubing rig comprising: a coiled tubing storage reel mounted on a trailer bed; a coiled tubing injector; an auxiliary tank; a control room; and a lifting device for selectably moving the control room between a stored position having a portion of the control room positioned within the auxiliary tank and an elevated position wherein a top of the control room is higher above the trailer bed than the coiled tubing storage reel and the coiled tubing injector.

Another embodiment of the present invention includes a trailer-mounted coiled tubing rig comprising: a coiled tubing storage reel; a coiled tubing injector; an auxiliary tank having a bottom and four sides; a control room having an underside and a center; a space frame mounted on the underside of the control room facing the auxiliary tank, wherein the space frame has centrally positioned lifting device alignment structure; and a lifting assembly including a lift assembly body positioned in the center of the control room and an extendable rod traversing the lifting device alignment structure and attached to the bottom of the auxiliary tank, the lifting assembly selectably reciprocates the control room from a first stored position to a second elevated position, wherein a portion of the control room is positioned within the auxiliary tank in the first stored position and wherein a top of the control room is moved away from a bottom of the auxiliary tank until the top of the control room is positioned at a greater height from the trailer than the coiled tubing storage reel and the coiled tubing injector.

The foregoing has outlined rather broadly several aspects of the present invention in order that the detailed description of the invention that follows may be better understood and thus is not intended to narrow or limit in any manner the appended claims which define the invention. Additional features and advantages of the invention will be described hereinafter which form the subject of the claims of the invention. It should be appreciated by those skilled in the art that the conception and the specific embodiment disclosed may be readily utilized as a basis for modifying or designing the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
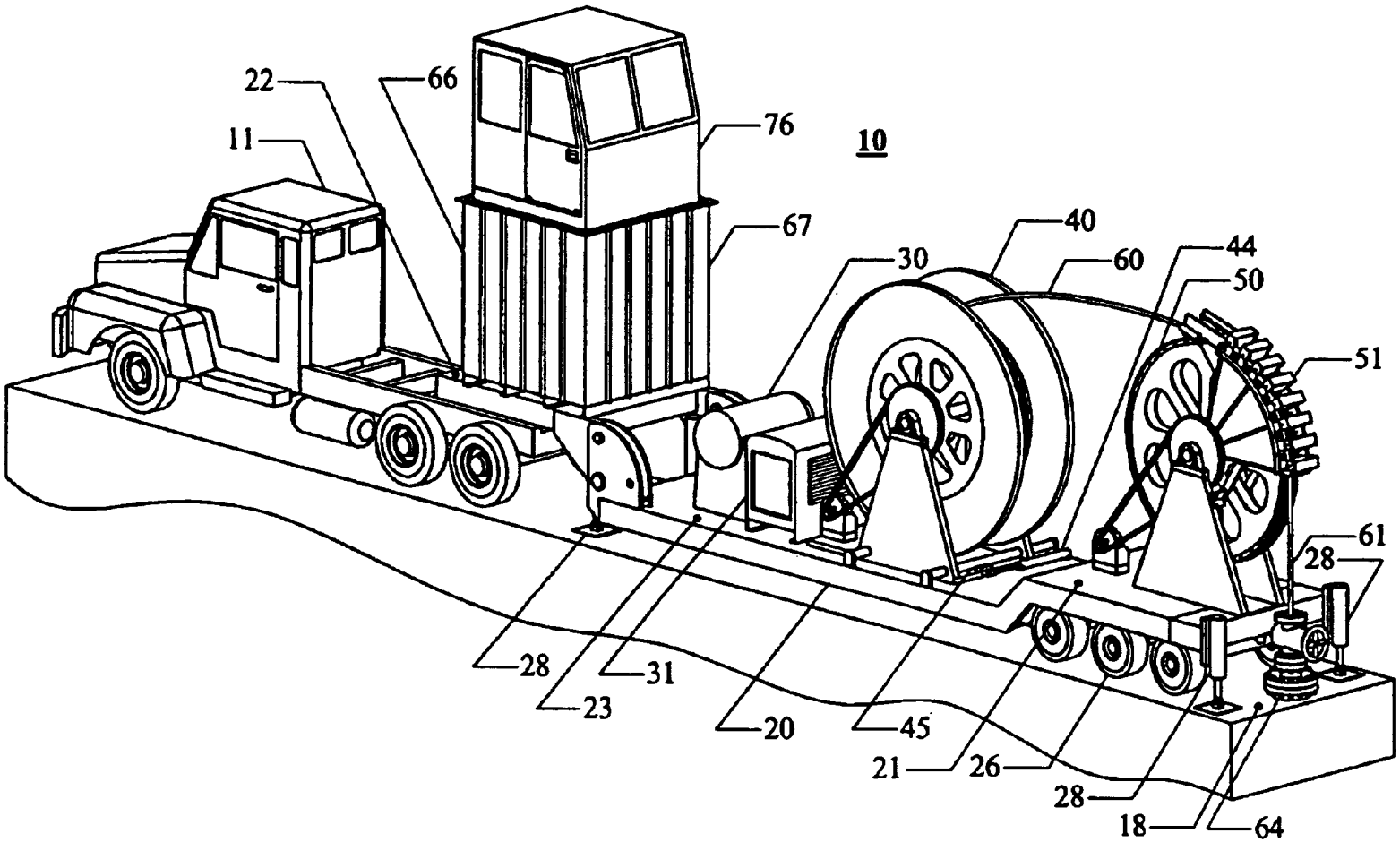
FIG. 1 is an oblique side view of a trailer mounted coiled tubing rig having a control room positioned over an auxiliary tank.

As a note, the use of the terms "invention", "present invention" and variations thereof throughout the subject patent application (and headings therein) are intended to refer or relate to one or more embodiments of the present application, not necessarily every embodiment or claim of the application.

Referring now to the drawings, it is noted that like reference characters designate like or similar parts throughout the drawings. The figures, or drawings, are not intended to be to scale. For example, purely for the sake of greater clarity in the drawings, wall thicknesses and spacings are not dimensioned as they actually exist in the assembled embodiments.

Typically, steel is used to construct the metallic load carrying structures. For some purposes involving contact between the tubing and the tensioning wheel, high stiffness rubber or plastics are generally used. Most of the equipment on the trailer shown herein is commercially available and is not part of the present invention; it is included herein only for purposes of illustrating the need for and use of the present invention and is therefore not described in detail.

For some of the figures, certain components are not shown in order to avoid overly complicating the drawings. For example, control cables, hydraulic lines, and the fluid system for feeding the reel are not shown. These features are well known to those skilled in the art.

Figure 2:
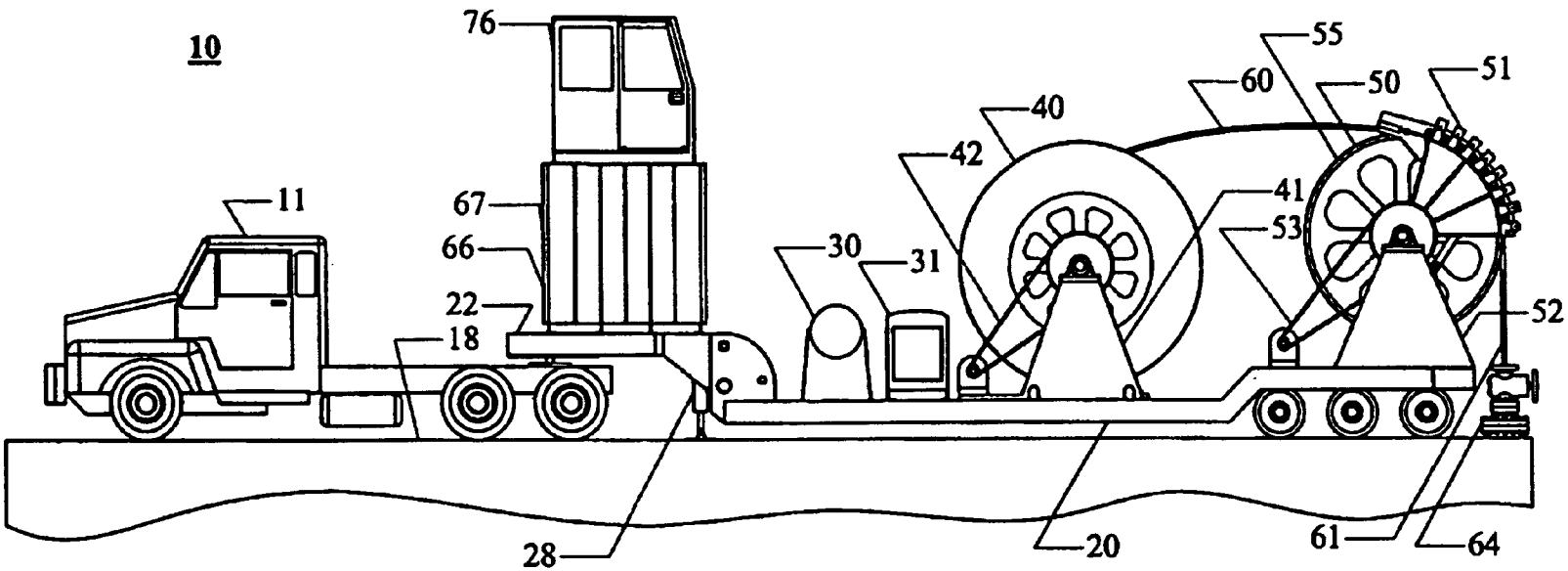
FIG. 2 is a side profile view of the coiled tubing rig shown in FIG. 1.

Referring to FIGS. 1 and 2, a trailer mounted coiled tubing rig 10, for use in drilling or servicing wells, is shown set up and working at a well location. The rig arrangement shown is one embodiment of a currently available coiled tubing rig layout, with the exception of the combination of the control room 76 for the rig and the auxiliary tank 67 integrated into a control room assembly 66.

The basic elements of a trailer mounted coiled tubing rig 10 are a tractor 11 for pulling the trailer 20, a power source 31 fed by fuel tank 30, a tubing storage reel 40, a tubing injector 50 tubing 60, and a control room 76. The power source 31, the fuel tank 30, the tubing storage reel 40, the tubing injector, 50, the tubing 60, and the control room 76 are all mounted on the trailer 20.

Trailer 20 is normally of the "low boy" type, given that the tubing storage reel 30 is normally rather tall. The length of the low boy trailer used is at or close to a maximum practical length for use on the unimproved roads that frequently provide the only access to the well locations. The entire rig 10 is supported on surface 18, which can be either a roadway or the surface of the ground.

The tractor 11 is a standard commercially available unit with multiple rear axles to support the large weight at the rear of the trailer 20 and a fifth wheel (not shown) for providing a pivoted connection between the tractor and the trailer. The low boy trailer 20 has an elevated rear deck 21, a depressed central deck 23, and an elevated forward deck 22. The rear deck 21 has multiple axles with tires 26 and a suspension system (not shown) supporting it underneath. The rear deck 21, the forward deck 22, and the central deck 23 have longitudinal beams that run underneath and are structurally connected to the decks to provide bending strength and stiffness to the trailer 20.

Selectably axially reciprocal stabilizing jacks 28 are located at the forward outboard corners of the central deck 23 and the rear outboard corners of the rear deck 21 of the trailer 20. These jacks 28 are extended to firmly engage the surface 18 when the trailer 20 is positioned ready to service a well. The jacks 28 are used so that the trailer 20 will be more stable when its load shifts as the amount tubing 60 on the tubing storage reel 40 changes or the tension of the wellhead tubing 61 located adjacent the wellhead 64 changes. Note that the rear jacks 28 are not shown in FIG. 2 for clarity.

The fuel tank 30 is located adjacent the forward end of the central deck 23, and the power unit 31 is located slightly to the rear of the fuel tank. The fuel tank 30 is mounted on a pair of pedestals and is generally a standard cylindrical lank with elliptical ends. The fuel tank 30 provides a sufficient supply of fuel to operate the power unit 31 for a period long enough to complete most jobs without refueling. The power unit 31 drives one or more hydraulic pumps and an electrical generator to power the reeling and tensioning of the coiled tubing 60 and other functions of the rig 10.

The tubing storage reel 40 is a large device which stores a sufficient amount of steel tubing 60 to permit reaching the bottom of the wells for which the rig 10 is capable. The tubing storage reel 40 both pays out and relieves the tubing 60. The location of the tubing storage reel 40 is on the central deck 23 to the rear of the power unit 31 and forward of the rear deck 21 of the trailer 20.

The reel 40 has a horizontal shaft which provides a rotational axis which is transverse to the longitudinal vertical midplane of the trailer 20. The shaft is supported by a large bearing pillow block on each side, while the pillow blocks are in turn supported on a pedestal 41. The pedestal 41 consists of a pair of trapezoidal vertical spaced apart slabs parallel to the sides of the trailer 20 and joined by a rectangular base plate. The width of the pedestal 41 is approximately half of the width of the trailer 20. The base plate of the pedestal 41 extends a short distance forward of the forward edge of the pedestal slabs. The two slabs of the pedestal 41 each have a transverse forward and rear through hole parallel to and slightly above the base plate. The forward holes are mutually coaxial, as are the rear holes.

A large driven chain sprocket is mounted on the reel shaft on the lefthand side of the reel 40 so that the reel can be rotated bidirectionally by drive chain 42. Drive chain 42 is bidirectionally driven in turn by a small chain sprocket mounted on the output shaft of the hydraulic motor of hydraulic motor assembly 43. A hydraulic motor is mounted on a mounting base for the hydraulic motor assembly rigidly attached to the upper surface of the forward extension of the pedestal 41 so that the chain sprockets are in alignment.

Levelwinding of the tubing 60 is required to achieve compact storage and avoid overstress where wraps of tubing cross each other. The hub of the reel 40 has a diameter sufficiently large that repetitive bending cycles of the tubing 60 will not prematurely fatigue the tubing. The tubing 60 coiled on the reel 40 is laterally constrained between opposed side flanges.

A double acting hydraulic levelwind actuation cylinder 44 selectably controlled from the control room 76 has a cylindrical body mounted transversely in a horizontal position to the upper surface of the central deck 23 of the trailer 20. The rod end of the levelwind actuation cylinder 44 is attached to the middle of the base plate of the pedestal 41 on its rear vertical side. A pair of tubular horizontal transverse guide rails 45, positioned slightly above the central deck 23 and engaged in the transverse holes at the bottom of the slabs of the pedestal 41, provide support for the tubing storage reel 40.

Each transverse guide rail 45 is mounted by its end block, with the outside transverse face of each end block flush with its respective side of the trailer 20. The combination of the length of the transverse guide rails 45 and the width between flanges of the reel 40 is selected so that system operator controlled lateral shifting of the position of the reel by the levelwind actuation cylinder 44 causes the coiled tubing 60 to properly nest on the reel.

The tubing injector system 50 is mounted on the longitudinal centerline of the rear deck 21 of the trailer 20. The embodiment of the tubing injector 50 described herein is a reversible wheel type injector and is used to apply the primary tractive loads to the tubing 60 to urge the tubing into or out of the well. Often a well servicing job requires that the tubing 60 be forcefully injected through a device which seals between the wellhead 64 and the wellhead tubing 61 which enters in the well bore. Likewise, frequently the weight of the tubing 61 in the well exceeds the axial pressure load applied to the tubing, requiring tractive force to lift the tubing from the well.

The tubing injector system 50 consists of a drive wheel 55 mounted on a pedestal 52 and driven by a hydraulic motor assembly 54 engaging a drive chain 53. A structure supporting a series of coacting radially inwardly urged rollers constitutes a radially acting holddown mechanism 51.

The drive wheel 55 has two parallel circular side plates connected by a cylindrical annular ring set inwardly from their outer circumference. An array of multiple closely spaced support blocks are fitted to the annular ring on their inward side and have an annular groove in the center of their outer side. Through bolts parallel to the wheel axis penetrate the side plates and the support blocks to provide support to the tubing 60 in the groove of the support blocks.

The drive wheel 55 has an axial horizontal shaft attached to the side plates which provides a rotational axis which is transverse to the longitudinal vertical midplane of the trailer 20. The shaft is supported by a large bearing pillow block on each side, while the pillow blocks are in turn supported on a pedestal 52. The pedestal 52 consists of a pair of trapezoidal vertical spaced apart slabs parallel to the sides of the trailer 20 and directly connected to the upper surface of the rear deck 21 of the trailer 20.

A large driven chain sprocket is mounted on the shaft on the leftward side of the drive wheel 55 so that the wheel can be rotated bidirectionally by drive chain 53. Drive chain 53 is bidirectionally driven in turn by a small chain sprocket mounted on the output shaft of the hydraulic motor of hydraulic motor assembly 54. A hydraulic motor is mounted on a mounting base for the hydraulic motor assembly 54 rigidly attached to the upper surface of the rear deck 21 so that the chain sprockets are in alignment.

The radially acting holddown mechanism 51 is coaxially structurally supported on two nonrotating mirror image reinforced plate arcuate sectors which straddle drive wheel 55. The radially inward holddown reaction on the tubing in the groove of the drive wheel 55 is provided by a set of circumferentially spaced parallel grooved tubing rollers having axes parallel to the drive wheel and engaging the coiled tubing 60 over its arc of contact with the drive wheel. The tubing rollers are mounted on supports which are retained in and guided by radial slots on the outer periphery of the arcuate plate sectors.

Each tubing roller support has a sheave located at its opposed distal ends. Static sheaves are located on both outer sides of the arcuate plate sectors inwardly from the periphery, with one static sheave mounted to each side of each sheave. On each side of the holddown mechanism 51, a single pulldown cable is anchored at the bottom end of the array of static sheaves and tensioned on its opposed end by a hydraulic cylinder. The pulldown cables are engaged alternately in the direction towards their tensioning hydraulic cylinders by the static sheaves and the sheaves on the tubing roller supports. The net reaction force on each tubing roller is thus radially inward. This radially inward force enhances the frictional forces between the drive wheel 55 and the tubing 60, thereby permitting the tubing to be engaged only over a relatively small arc of the drive wheel in order to develop any necessary tractive force.

The wellhead 64 is shown open and without a blowout preventer for clarity. The portion of the wellhead coiled tubing 61 entering or exiting the well passes into the bore of the wellhead 64 from the drive wheel 55 or the tubing injector 50 and down into the well.

The control room assembly 66 of the present invention is shown centrally mounted on the forward deck 22 of the trailer. The control room 76 of the control room assembly 66 is shown in its upper operating position in FIGS. 1 and 2 and in its lowered roadworthy position in FIG. 3. The control room housing 77 is configured so that it can be selectably nested within the auxiliary tank 67 in a stored position during transit, but can also be selectably elevated during operation. Thus, the control room 76 is reciprocable between an elevated position up out of the tank and a stored position recessed back into the tank.

In order for the operator, positioned in the control room 76 to be able to see and control the feeding of the coiled tubing 60 to and from the tubing storage reel 40, it is necessary for the control room housing 77 to be elevated sufficiently so that the operator can see both the tubing at its contact on the reel and on the reel side of the injector system 50. The required operating level of the control room housing 77 makes it substantially higher than the other rig components on the trailer 20.

Figure 3:
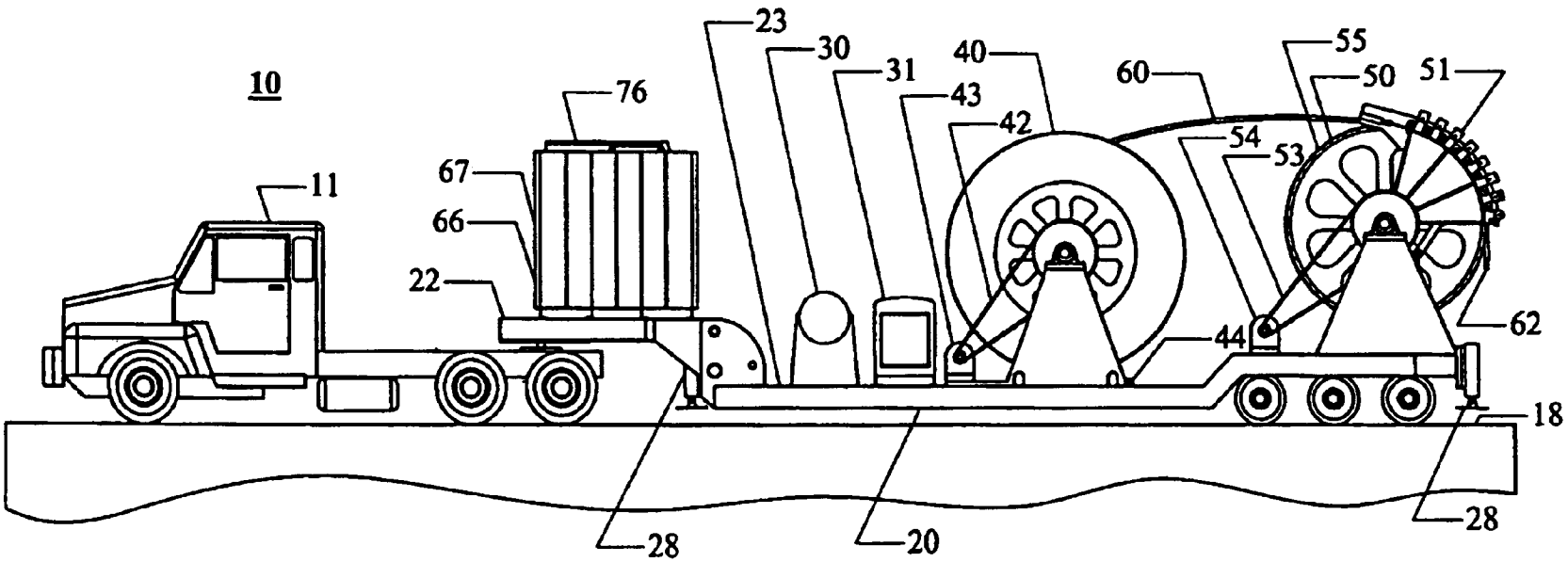
FIG. 3 is a side profile view of the coiled tubing rig prepared for transit wherein the control room is stowed within the auxiliary tank.
Figure 4:
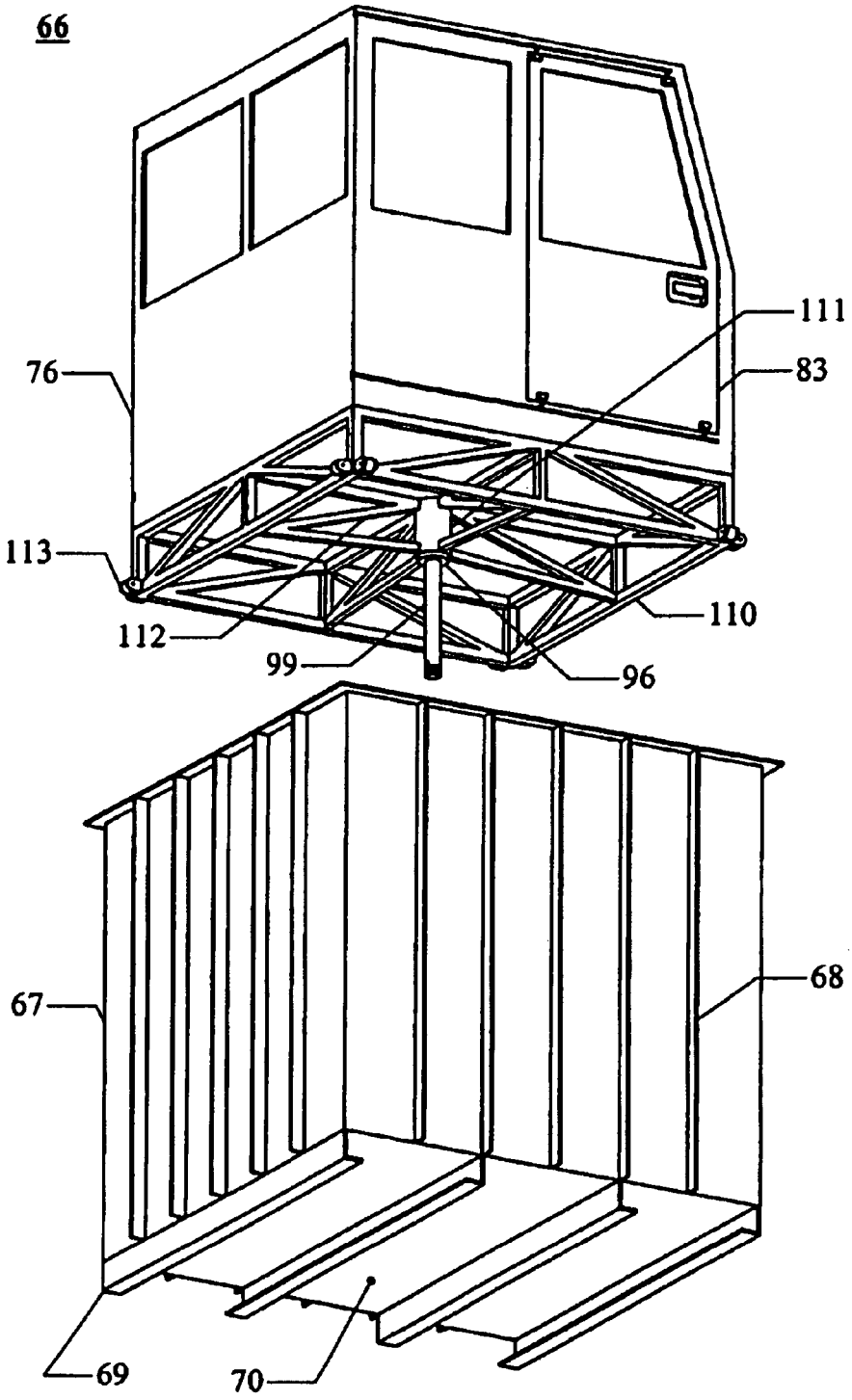
FIG. 4 is an oblique exploded view of the control room/water tank assembly.

However in order to keep the overall height of the coiled tubing rig 10 within reasonable limits for highway travel, the control room housing 77 is lowered to about the same or a lower height than the tops of the reel 40 and the injector 50, as seen in FIG. 3. When the control room housing 77 is up, there is sufficient room underneath it for the auxiliary tank 67 to be placed underneath it.

FIGS. 4 through 10 show the details of the control room assembly. Referring to the exploded view of FIG. 4, the control room assembly 66 is seen to consist of an auxiliary tank 67 and a control room 76.

Figure 10:
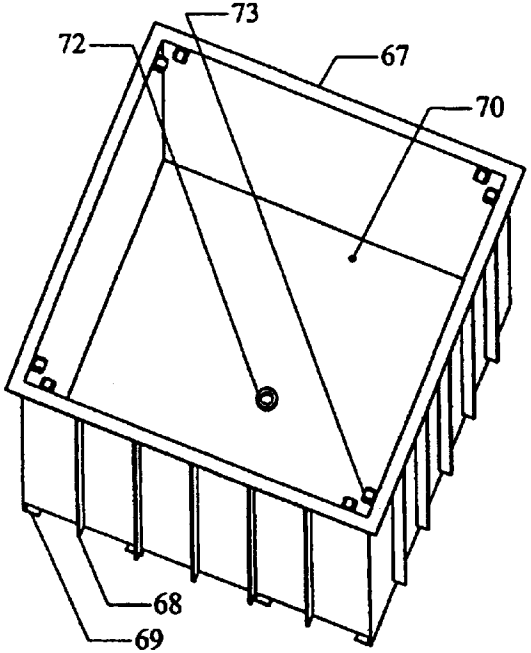
FIG. 10 is an oblique view of the auxiliary tank showing its interior.

The auxiliary tank 67, shown in an oblique view from above in FIG. 10, is an open top rectangular structure constructed primarily of stiffened flat plate elements. The tank bottom 70 is a square plate with transversely oriented angles welded to its lower surface to serve as standoff beams 69. The standoff beams 69, which have one leg of the angle up and one parallel to and offset from the tank bottom, serve to stiffen the tank bottom 70 and to permit a forklift to lift the tank 67 if necessary.

The four tan sides 71 of the auxiliary tank 67 are rectangular plate segments which are mounted flush with the outer periphery of the tank bottom 70 and are stiffened with multiple regularly spaced vertical plate strip reinforcing ribs 68 welded perpendicular to the outer surface of the tank sides. Welded horizontal plate strips serve as an outwardly extending upper flange around the upper edge of the auxiliary tank 67.

Centrally located on the upper side of the tank bottom 70 is a right circular cylindrical lift cylinder rod attachment 72 that is generally attached to the tank bottom by welding. The lift cylinder rod attachment 72 has a central vertical hole which has a female thread so that it can be comated with the distal male threaded rod end 101 at the lower end of the rod 99 of the lift cylinder assembly 95 of the control room 76.

Eight guide rollers 73 are on the vertical interior tank sides 71 located laterally inwardly from the interior vertical corners and just below the top interior edge of the auxiliary tank 67. The guide rollers 73 are mounted on brackets which journal their horizontal shafts, with the brackets being attached to the sides 71 by nuts and bolts engaged through holes in the sides of the tank. Looking downwardly at the tank 67, the guide rollers 73 are each spaced inwardly by approximately two inches more than half the difference between the inside tank dimension and the outside dimension of the control room housing 77 or the control room 76. Thus, each vertical corner of the auxiliary tank 67 is provided with two inwardly projecting guide rollers. The interior vertical tank sides 71 are typically flat and smooth except for the rollers adjacent their upper edges.

For reasons of drawing clarity, the fluid connections and fittings for the auxiliary tank 67 are not shown herein. However suitable provisions for fluid connections and fittings of the auxiliary tank 67 are well understood by those skilled in the art. It is noted here that the auxiliary tank 67 of the control room assembly 66 is kept dry whenever the control room 76 is recessed within the tank.

The control room 76 consists of a housing 77 with a hydraulic lift cylinder assembly 95 and a support space frame 110 mounted to the underside of the housing. The housing 77 may have a variety of shapes as long as the major portion of the housing can nest within the auxiliary tank 67. Generally, the housing 77 is square in plan view and has a height equal to approximately its width and depth. The size of the housing 77 in plan view is such that its outer dimensions are approximately 0.125 to 0.25 inch less than the distance between the inner cylindrical surfaces of the guide rollers 73 of the water tank 67. Viewed from the side, the typical housing 77 appears almost square except that its upper rearward face above approximately midheight is sloped at approximately 15° from the vertical towards the front of the trailer. The housing 77 is symmetric about the longitudinal midplane of the housing and of the trailer 20, so only one side of the housing exterior will be described herein.

Figure 5:
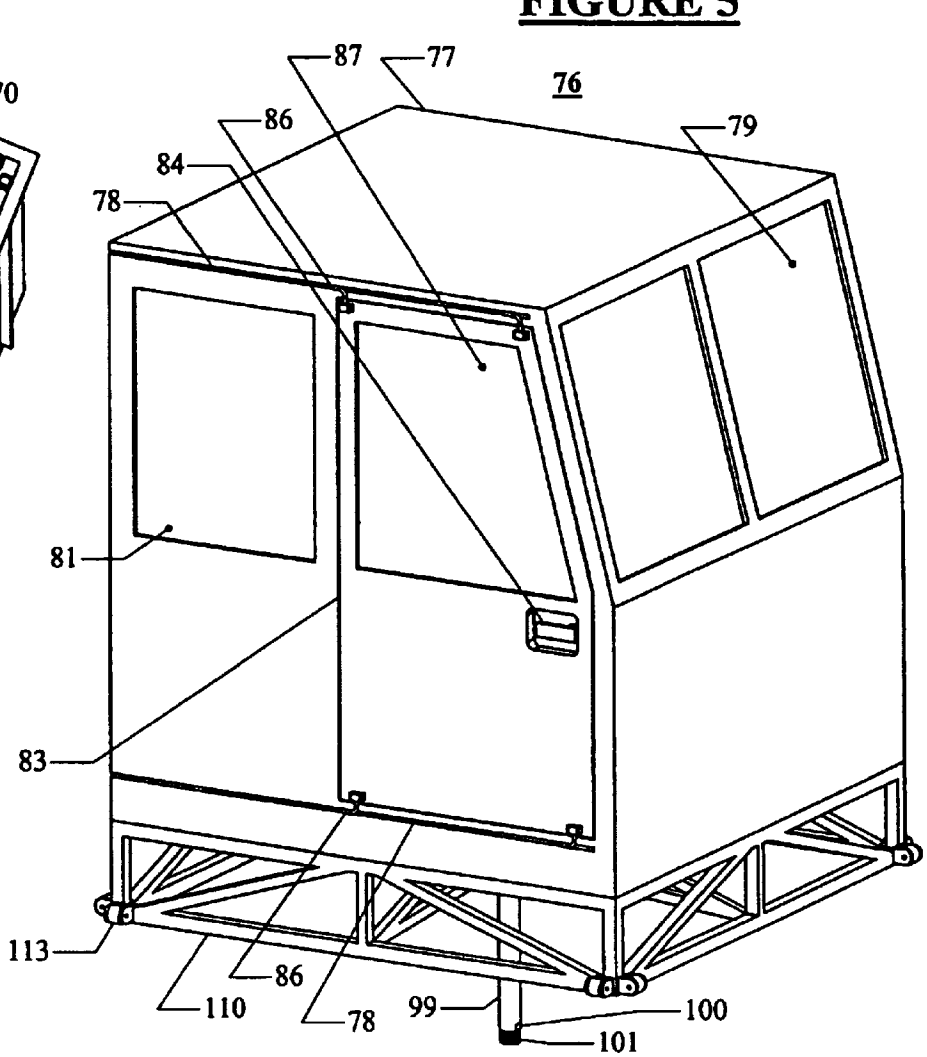
FIG. 5 is an oblique view of the control room.

Referring to FIG. 5, the lefthand side of the housing 77 is seen. The lefthand side has an upper and a lower horizontal door guide groove 78 extending from the forward side of the housing to a short distance from the rear side. The door guide grooves 78 have tee cross-sections, with the bar of the tee vertical. The door guide grooves 78 engage swiveling door mounts 86 attached to the upper and lower edges of the door 83.

The housing 77 of the control room 76 has a rear window 79 facing in the direction of the storage reel 49 and the tubing injector 50. The embodiment shown in FIG. 5 illustrates a rear window 79 on both sides of the rear inclined face. On the forward lefthand side is located a side window 81, while the front side of the housing 77 has a pair of forward facing front windows 80.

A flush mounted door 83 is positioned between the side window 81 and the rear side of the housing 77. The door 87 has a recessed exterior door handle 84 and a pair of swiveling door mounts 86 on both its upper and lower edges. The door 83 also has a window 87 extending from about midheight. On the interior side of the door 83 is an interior door handle 85, as seen in FIGS. 6 and 7.

The swiveling door mounts 86 include small support blocks rigidly mounted to the outside surface of the door and a vertical hole with an axis slightly offset from the outer face of the door. Engaged in the vertical hole of each support block of a door mount 86 is an L-shaped round bar having a rotational slip fit with the vertical hole. The vertical leg of the L-shaped bar is approximately 3 inches long and is cojoined by a horizontal leg having a length of about 5 inches. The diameter and vertical positions of the L-shaped round bars are such that their horizontal legs are aligned with the door guide grooves 78 and are engaged in their respective horizontal slots of the door guide grooves. Each distal end of the horizontal leg of an L-shaped bar has a short perpendicular vertical round bar sized to loosely fit in the vertical leg of its door guide groove 78.

Figure 6:
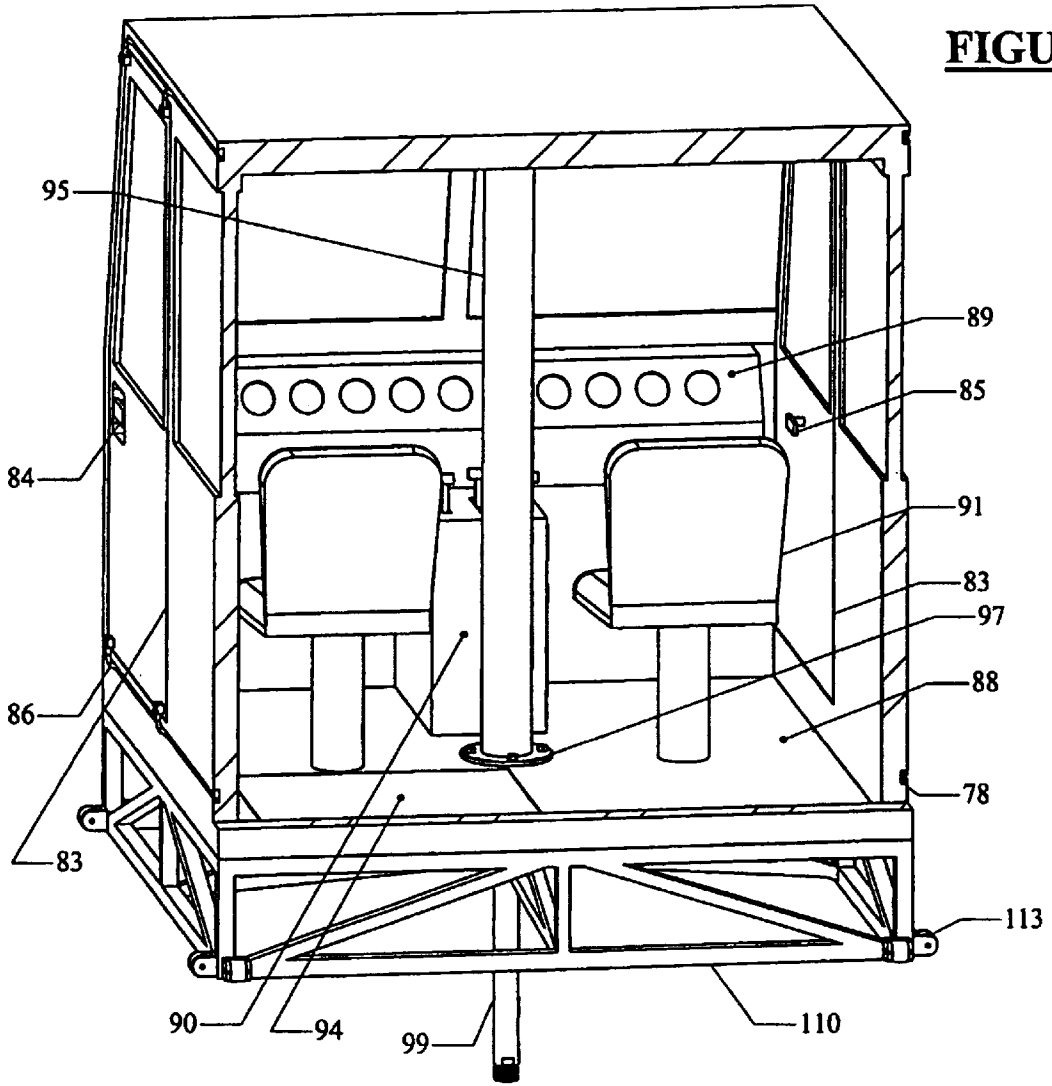
FIG. 6 is an oblique view of the control room with its forward wall partially cut away to illustrate the interior layout of the control room.
Figure 7:
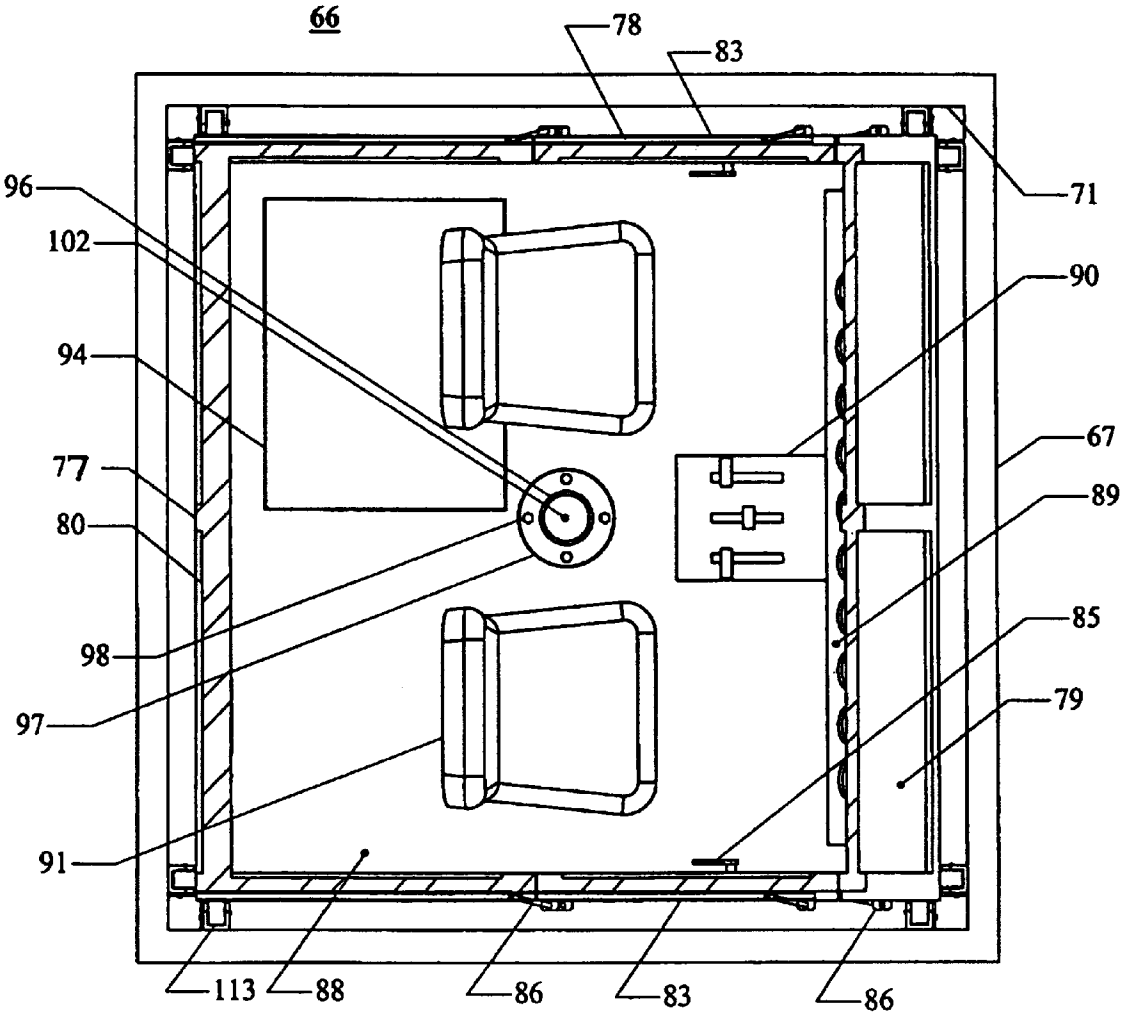
FIG. 7 is a plan view of the control room with its roof cut away to further illustrate the interior layout of the control room.
Figure 9:
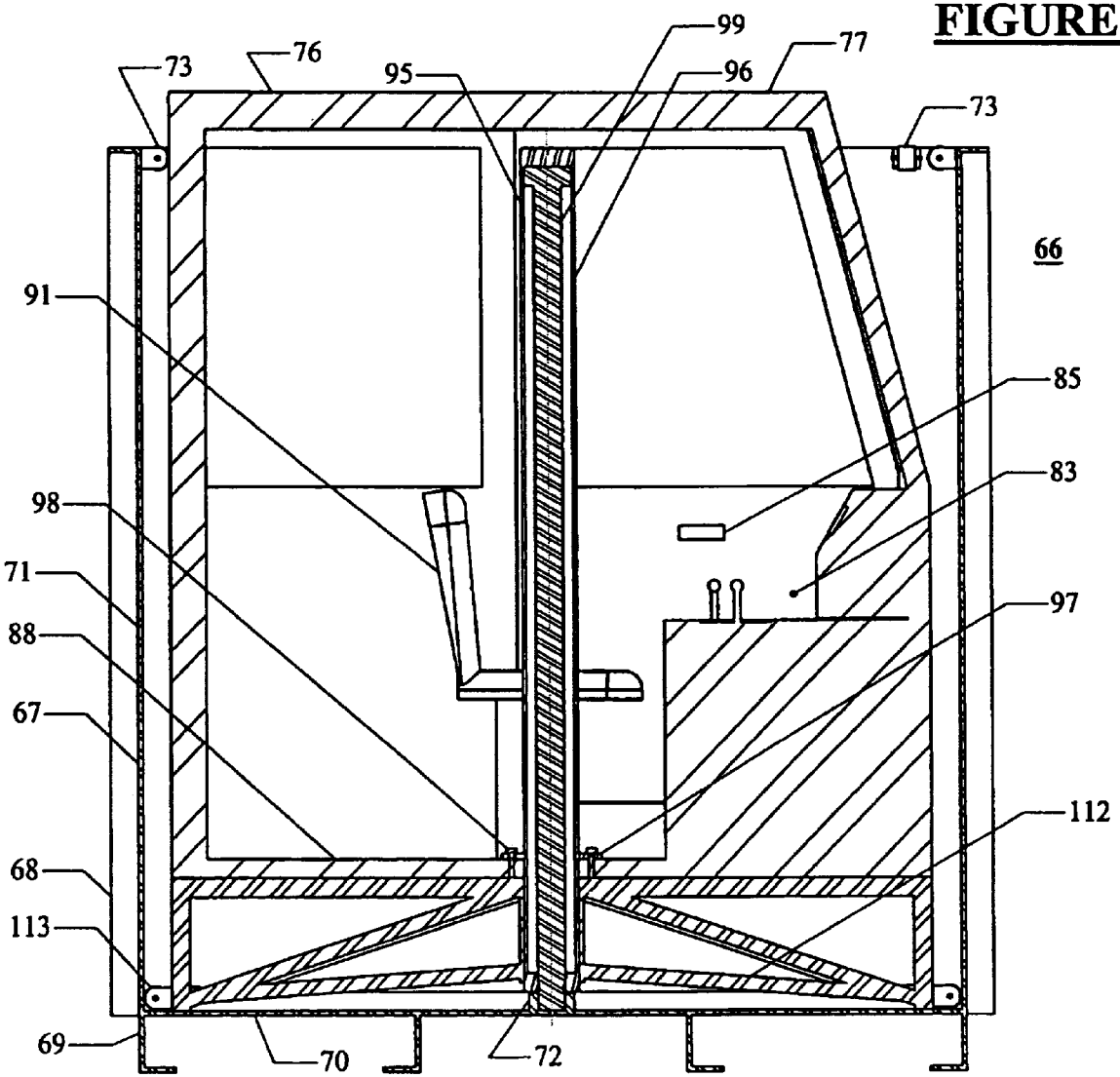
FIG. 9 is a view of the control room/water tank combination with the control room retracted into its traveling position within the auxiliary tank.

FIG. 6 shows the control room housing 77 from its forward side with the forward side cut away to reveal the interior features, while FIGS. 7 and 9 respectively show cutaway floor plan and longitudinal profile views. The interior of the control room housing 77 has a floor 88 depressed below the bottom of the doors 83, a dashboard 89 holding various instruments for monitoring the status of the rig 10, a control console 90 with means for manually controlling the function of the various equipment items of the rig, and a pair of swiveling operator seats 91 on tubular pedestals 92.

While not shown in the drawings, hydraulic and electrical connections are provided as necessary between the control room 76 and the rest of the coiled tubing rig 10. A trap door or access panel 94 is provided in the floor forward of the seats 91 for access to the space below the housing 77.

The lift cylinder assembly 95 is located vertically in the middle of the control room. The lift cylinder assembly can be either a double or single acting hydraulic cylinder. The lift cylinder assembly 95 consists of a conventional cylinder body 96 and rod 99. The hollow tubular cylinder body 96 has a blind transverse upper end and a sealing gland on its transverse lower end with the gland having a reduced diameter for engaging the cylinder rod 99.

Approximately 12 inches above its lower end, the cylinder body 96 has a transverse outwardly extending mounting flange 97 provided with a bolt hole circle. A vertical through clearance hole for the cylinder body 96 is provided in the center of the floor 88 so that the lower end of the cylinder body 96 can extend through the floor to underneath the housing 77. Multiple mounting bolts 98 engaged in the bolt hole circle are threadedly engaged with corresponding bolt holes on the upper surface of the floor 88 of the housing 77.

The cylinder body 96 is provided with a first port at its upper end and a second port at its lower end, wherein the ports open into the interior of the cylinder. Pressure on the first port is used to extend the rod 99, while pressure on the second port is used to retract the rod.

The rod 99 of the cylinder assembly 95 is an elongated cylinder with a transverse piston head 102 mounting annular seals on its upper end. At its distal lower end, the cylinder rod 99 has a wrench flat 100 and male threads 101 comatable with the female threads of the cylinder rod attachment 72 of the auxiliary tank 67. Normally, the rod 99 is made either of stainless steel or is plated or otherwise treated to minimize its tendency to corrode from any fluids which might be stored in the auxiliary tank 67 of the control room assembly 66.

Attached underneath the housing 77 of the control room 76 is a support space frame 110. The support space frame 110 has the same outer dimensions in plan view as does the housing 77 of the control room 76. The space frame 110 generally has a height of approximately 16 inches and serves as an extension of the height of the control room package. An additional function of the space frame 110 is to efficiently transfer loads from the lift cylinder assembly 95 to the perimeter of the housing 77 of the control room 76. The space frame 110 is rigidly attached to the bottom of the housing 77 both on its perimeter and in the center by threaded fasteners (not shown).

Figure 8:
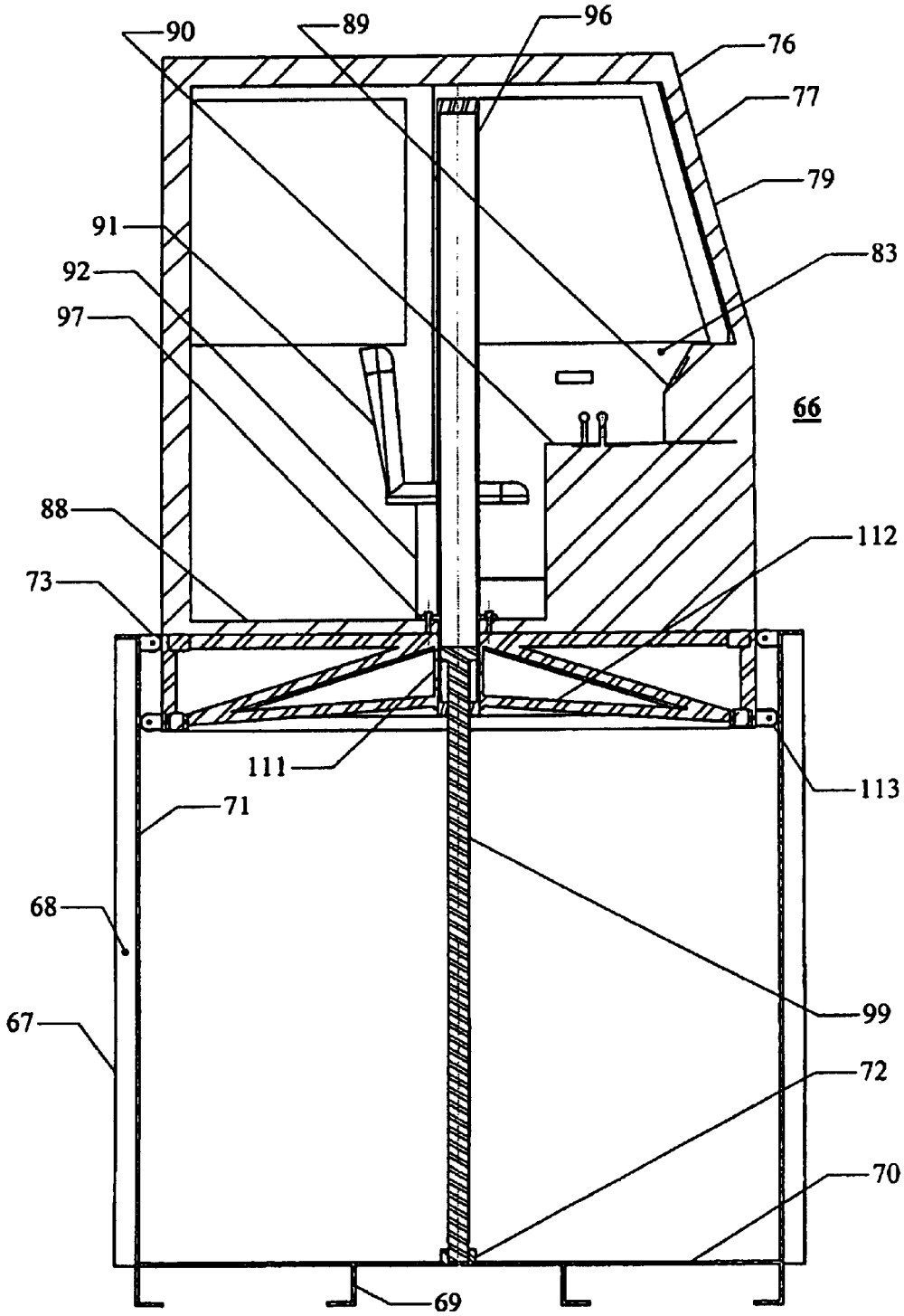
FIG. 8 is a longitudinal cross-sectional view of the control room/water tank combination with the control room in its elevated operational position.

The space frame 110 is constructed primarily of square and rectangular tubing, with diagonally braced side panels and four diagonally braced panels 112 extending inwardly from the side panels to a short vertical cylinder allotment tube 111 located in the center of the space frame as shown in FIG. 8. The cylinder alignment tube 111 is a close slip fit to the outer diameter of the cylinder body 96 of the lift cylinder assembly 95, but does not cover the cylinder ports at the lower end of the cylinder. The cylinder alignment tube 111 aids in alignment and resisting any bending loads which might be applied to the cylinder assembly 95. The fully retracted rod 99 of the lift cylinder assembly 95 does not extend below the bottom of the space frame 110.

OPERATION OF THE INVENTION

The elevation and operation of the control room 76 proceeds after the rest of the coiled tubing rig 10 is set up on location. Setting up the rest of the rig 10 requires that the vertical outlet of the coiled tubing injector 50 with the free end 62 of the coiled tubing be aligned with the wellhead 64. Also, the jacks 28 should be extended to bear on the ground surface 18, and the power unit 31 started. At this point, the control room assembly 66 is ready to be changed from its stowed position with the control room 76 recessed in the tank as shown in FIG. 3 to its operational position shown in FIGS. 1 and 2.

The control room 76 is elevated to its operational position by selectably actuating a valve (not shown) to apply pressurized hydraulic fluid from the power unit 31 to the first (upper) port of the lift cylinder assembly and opening the second (lower) port to drain into the tank of the power unit 31. When the piston rod 99 is fully extended, the control room 76 is in its operational position, as shown in FIGS. 1, 2, and 8. Although not shown herein for reasons of clarity, a rod locking device for the lift cylinder assembly 95 is generally used to passively hold the control room 76 in place.

The control room 76 is axially reciprocated out of or into the auxiliary tank 67 by the lift cylinder assembly 95. Whenever the control room 76 is positioned at either of its distal positions or at any elevated position between its stored position and its distal or top elevated position, the guide rollers 73 of the tank 67 bear either on the outer walls of the housing 77 or the vertical corner members of the support space frame 110. At the same time, the guide rollers 113 of the space frame 110 bear against the interior tank sides 71 of the auxiliary tank 67. These rollers thus accurately control the control room 76 position to ensure that the rod 99 of the lift cylinder assembly 95 is protected from side loads.

While not shown herein, one or two separate ladder assemblies extending from the ground surface to the just below the door or doors 83 are generally used for access to the control room 76. These ladders may include an upper landing platform with hand rails.

The doors 83 of the housing 77 of the control room module are flush, but can be swung out of the door opening in the housing by pivoting on the swiveling door mounts 86. Following this, the doors 83 can be moved for access to the control room interior by sliding them forward with the vertical distal ends of the swiveling door mount pivoting rods engaged in the door guide grooves 78. Door closing is achieved by reversing the process. This type of door opening is preferable to using hinged swinging doors because of the typically limited space on the upper landing platforms of the access ladders.

When the control room 76 is elevated, the operator or operators of the coiled tubing rig 10 are able to clearly see through the rear windows 79 both the level winding operation for the storage reel 40 and the entry/exit of the tubing 60 between the storage reel 40 and the coiled tubing injector 50. Although not shown here, one or more television cameras can have displays on the dashboard 89 of the control room so that images from the wellhead 64 or other locations of interest are available. A sufficient range of instrumental displays and control devices are in easy reach of a rig operator seated in either of the operator seats 91.

Assembly and disassembly of the threaded connection of the rod 99 of the cylinder 95 into the lift rod cylinder attachment 72 on the bottom of the auxiliary tank 67 is possible when the access panel 94 in the interior of the housing 77 of the control room module is opened. The access panel 94 also permits inspection and servicing of the hydraulic connection to the rod end of the cylinder 95.

The auxiliary tank 67 of the control room assembly 66 can be selectably filled and emptied as desired without affecting the control room 76 when the control room is elevated. The auxiliary tank 67 is always emptied poor to lowering the control room 76. Use of the capacity of the auxiliary tank 67 is not impaired by having the rod 99 of the lift cylinder 95 in the tank. Likewise, the storage of the control room 76 within the tank 67 for transit does not impair the functionality of the tank as a fluid storage device.

Reversal of the set up process permits the control room 76 to be lowered back into the auxiliary tank 67 preparatory to moving the coiled tubing rig 10 off the well location.

The configuration of the control room assembly allows an auxiliary fluid tank on the coiled tubing service rig trailer without taking a much larger footprint than the control room 76 by itself. With a conventional coiled tubing rig, bringing an auxiliary tank for water or other fluids requires another truck and driver for hauling and therefore has a negative economic impact.

One advantage of the present invention is that a frequently useful equipment item, namely the auxiliary tank 67, is made available at a job site without its having to be brought with a separate vehicle and driver. Further, the provision of the auxiliary tank can be done inexpensively and without impairing the functionality or general operations of the rig using the present invention.

Certain changes can be made to the present invention without departing from the spirit of the invention. For example, different lifting means such as motor driven cable lift systems or lifting systems using multiple cylinders or cylinders with cables and sheaves could be utilized. Similarly, the lifting of the control room module could be done with a motor driven rack and pinion arrangement.

Although the present invention and its advantages have been described in detail, it should be understood that various changes, substitutions and alterations can be made herein without departing from the spirit and scope of the invention as defined by the appended claims.

What is claimes is:

1. A trailer-mounted coiled tubing rig comprising:

a coiled tubing storage reel mounted on a trailer;

a coiled tubing injector;

an auxiliary tank; and a control room selectably moved from a first stored position to a second elevated position, wherein a portion of the control room is positioned within the auxiliary tank in the first stored position and wherein a top of the control room is moved away from a bottom of the auxiliary tank until the top of the control room is positioned at a greater height from the trailer than the coiled tubing storage reel and the coiled tubing injector.

2. The trailer-mounted coiled tubing rig of claim 1, further comprising a lifting assembly.

3. The trailer-mounted coiled tubing rig of claim 2, wherein the lifting assembly includes a hydraulic cylinder having a cylinder body vertically traversing a center of the control room and an extendable rod attached to a bottom of the auxiliary tank.

4. The trailer-mounted coiled tubing rig of claim 1, wherein the control room is moved between the first stored position and the second elevated position by a hydraulic jack.

5. The trailer-mounted coiled tubing rig of claim 1, wherein the control room has a space frame mounted on an underside of the control room.

6. The trailer-mounted coiled tubing rig of claim 1, wherein the space frame has a lifting assembly alignment cylinder.

7. The trailer-mounted coiled tubing rig of claim 1, wherein the control room has an access panel in a floor of the control room.

8. The trailer-mounted coiled tubing rig of claim 1, wherein the auxiliary tank is sealed for holding liquids.

9. The trailer-mounted coiled tubing rig of claim 1, wherein the auxiliary tank is empty whenever the control room is in the first stored position and is selectably filled with liquid when the control room is in the second elevated position.

10. A trailer-mounted coiled tubing rig comprising:

a coiled tubing storage reel mounted on a trailer bed;

a coiled tubing injector;

an auxiliary tank;

a control room; and a lifting device for selectably moving the control room between a stored position having a portion of the control room positioned within the auxiliary tank and an elevated position wherein a top of the control room is higher above the trailer bed than the coiled tubing storage reel and the coiled tubing injector.

11. The trailer-mounted coiled tubing rig of claim 10, wherein the control room is moved between the stored position and the elevated position by a hydraulic jack.

12. The trailer-mounted coiled tubing rig of claim 10, wherein the lifting device includes a hydraulic cylinder having a cylinder body vertically traversing a center of the control room and an extendable rod attached to a bottom of the auxiliary tank.

13. The trailer-mounted coiled tubing rig of claim 12, wherein the control room has a space frame mounted on an underside of the control room and wherein the space frame has a lifting device alignment cylinder.

14. The trailer-mounted coiled tubing rig of claim 13, wherein the rod traverses the lifting device alignment cylinder.

15. The trailer-mounted coiled tubing rig of claim 10, wherein the control room has an access panel in a floor of the control room.

16. The trailer-mounted coiled tubing rig of claim 10, wherein the auxiliary tank is sealed for holding liquids.

17. The trailer-mounted coiled tubing rig of claim 10, wherein the auxiliary tank is empty whenever the control room is in the stored position and is selectably filled with liquid when the control room is in the elevated position.

18. A trailer-mounted coiled tubing rig comprising:

a coiled tubing storage reel;

a coiled tubing injector;

an auxiliary tank having a bottom and four sides;

a control room having an underside and a center;

a space frame mounted on the underside of the control room facing the auxiliary tank, wherein the space frame has centrally positioned lifting device alignment structure; and a lifting assembly including a lift assembly body positioned in the center of the control room and an extendable rod traversing the lifting device alignment structure and attached to the bottom of the auxiliary tank, the lifting assembly selectably reciprocates the control room from a first stored position to a second elevated position, wherein a portion of the control room is positioned within the auxiliary tank in the first stored position and wherein a top of the control room is moved away from a bottom of the auxiliary tank until the top of the control room is positioned at a greater height from the trailer than the coiled tubing storage reel and the coiled tubing injector.

19. The trailer-mounted coiled tubing rig of claim 18, wherein a bottom of the control room has an access panel providing access to the auxiliary tank.

20. The trailer-mounted coiled tubing rig of claim 18, wherein each side of the auxiliary tank has a pair of internally facing rollers that interact with an exterior of a housing of the control room or with the space frame.

* * * * *